United States Patent
Ng

[19]

[11] Patent Number: 6,016,463
[45] Date of Patent: Jan. 18, 2000

[54] CHANNEL QUALITY MONITOR FOR READ CHANNEL IC

[75] Inventor: David Ng, Irvine, Calif.

[73] Assignee: Texas Instruments Incorporated, Dallas, Tex.

[21] Appl. No.: 08/702,888

[22] Filed: Aug. 26, 1996

[51] Int. Cl.[7] ..................................................... G11B 5/09
[52] U.S. Cl. ............................................. 702/69; 360/53
[58] Field of Search ................................. 702/69; 360/31, 360/40, 53; 369/53; 714/760, 769, 770, 780, 795

[56] References Cited

U.S. PATENT DOCUMENTS

| | | | |
|---|---|---|---|
| 5,121,263 | 6/1992 | Kerwin et al. | 360/53 |
| 5,341,249 | 8/1994 | Abbott et al. | 360/46 |
| 5,355,261 | 10/1994 | Taratorin | 360/53 |
| 5,408,367 | 4/1995 | Emo | 360/53 |
| 5,490,091 | 2/1996 | Kogan et al. | 364/554 |
| 5,490,181 | 2/1996 | Shimotashiro et al. | |
| 5,754,353 | 5/1998 | Behrens et al. | 360/53 |

FOREIGN PATENT DOCUMENTS

| | | |
|---|---|---|
| 0 365 257 A2 | 10/1989 | European Pat. Off. . |
| 0 530 776 A2 | 2/1992 | European Pat. Off. . |

OTHER PUBLICATIONS

Pablo A. Ziperovich, "Performance Degradation of PRML Channels Due to Nonlinear Distortions" IEEE Transactions on Magnetics, vol. 27, No. 6, Nov. 1991, pp. 4825–4827.

*Primary Examiner*—Patrick Assouad
*Attorney, Agent, or Firm*—W. Daniel Swayze, Jr.; Wade James Brady, III; Richard L. Donaldson

[57] ABSTRACT

The present invention discloses a method and apparatus for monitoring a read channel in a disk drive system and calibrating the disk drive system. A comparator is provided to detect the data samples that fall within a pre-programmed distribution window from a number of sectors in each zone of a disk. The output of a comparator is digitized and sent to a logic block to qualify the valid samples. A relative counter or histogram of the detected data samples is obtained. The valid sample count is fed to a n-bit counter that can be accessed via a serial port. The channel parameters can be adjusted based upon a relative figure of merit read off the serial port that reflects the distribution of the samples with respect to the target value after processing a statistically valid number of samples. After the initial calibration, the invention can be switched to count the number of invalid samples that fall outside the distribution window. Based upon the invalid sample count, the invention performs a fine tuning of the read channel system so that the invalid sample count decreases and reaches an acceptable value. The invention can be fully self-contained on chip if desired, and requires no more than the already existing serial port interface hardware, and very simple additional software.

15 Claims, 7 Drawing Sheets

CHANNEL QUALITY MONITOR FOR READ CHANNEL IC

BACKGROUND OF THE INVENTION

1. Field of the Invention

The present invention relates to the field of signal processing, and in particular, to signal processing in a partial-response (PRML) read channel.

2. Background Art

Communication of voice and data signals is often accomplished by converting analog signals to digital signals. These digital signals are then transmitted from a transmitting device to a receiving device, converted back to analog, if necessary, and communicated to a user. This digital transmission is often performed through analog channels. Digital information is transmitted in the form of a "symbol" representing a digital value. In some cases, adjacent symbols can overlap, resulting in a phenomenon known as intersymbol interference. This interference can corrupt a digital transmission, leading to errors in the receipt of the digital information.

Using partial response signaling allows a better handling of intersymbol interference as well as a more efficient utilization of the bandwidth of a given channel. In partial response systems, a controlled amount of intersymbol interference can be allowed.

However, a precoding is often performed to take a full advantage of partial response signaling, and a method for decoding the binary symbol sequence that is outputted from the channel in its corrupted form is required. For example, in a magnetic recording channel, maximum likelihood sequence estimation (MLSE) decoding in conjunction with partial response signaling systems can be used as an effective tool in pulse detectors for receiving and decoding digital transmissions that suffer from intersymbol interference.

FIG. 1 is the block diagram of a prior art read channel monitor system using the MSE (Mean Square Error) technique for PRML (Partial Response Maximum Likelihood) systems. Since PRML read channel systems are usually implemented in analog circuitry, the MSE signal of the input data samples is also analog. The analog MSE implementation shown in FIG. 1 for a PRML sampled read channel comprises differential subtractor 105 and gain stage 107 to obtain the difference between equalizer 101 output and the target Viterbi sampled value 103. An analog multiplier 109 coupled to gain stage 107 performs the squaring of the error signal.

The outputs of multiplier 109 are fed to an on-chip integrator 111 to obtain an analog MSE signal. The differential analog MSE signal is then brought off-chip via a differential analog output buffer 113 to an off-chip filter 115. The filtered MSE signal goes through a differential to single-ended analog conversion before digitized by the servo A/D and further processing by DSP microprocessor 119.

This prior art solution, however, is prone to error due to poor signal-to-noise ratio (SNR) caused by the small voltage difference between the sample and the target value, typically down to a few mV's as the data samples come close to the target. The analog summing and multiplying stages also add a fair amount of noise and offset to the MSE signal, making it difficult to filter. The long analog MSE signal path is also susceptible to degradation from other on-chip noise sources such as clocks and digital CMOS lines.

Further, the SNR of the analog MSE decreases as the channel approaches ideal equalization, which prevents the users to obtain the optimal settings. Bench experiments using an SSI 4910 PRML channel, manufactured by Silicon Systems, Inc., Tustin, Calif., indicates that the MSE method has relatively low sensitivity and does not provide a single optimum solution for the continuous time filter cutoff and boost as shown in FIG. 2.

FIG. 2 shows mean square error MSE as a function of bandwidth and gain. It is clear that there are multiple combinations of continuous time filter 115 cutoff frequency and gain stage 107 boost that yields lower MSE values. For example, at bandwidth 32 MHz, gain boost of 10 dB yields 9–10% MSE, which is also observed at bandwidth 29 MHz and gain boost of 7 dB. As can be inferred from FIG. 1, this analog MSE solution is hardware-intensive with both on-chip and off-chip components.

An alternative approach is to use a high-resolution analog-to-digital converter (ADC) to quantize the incoming signal, and perform digital operations of summing, multiplying, and averaging using hardware. This, however, is also a hardware-intensive solution, especially with the need for a high resolution ADC.

Viterbi Threshold Marginalization technique can be used to optimize the PRML read channel, as suggested by Z. Keirn, et al. in "A Window-Margin Like Procedure . . . ", IEEE Tran. on Magnetics, March 1995. Using this technique, the Viterbi threshold can be increased about 50% to marginalize the channel performance, and optimize the channel for $10^{-6}$ BER (bit Error rate) performance by mapping the BER contours with respect to the parameters in question as shown in FIG. 3. The optimized setting maps to a $10^{-9}$ range BER once the Viterbi threshold is returned to normal. The lower BER target reduces the tuning time of the hard disk drive, resulting in cost reduction in manufacturing.

However, this method interferes with the normal operation of the channel, and requires external custom software and hardware to process the data. It is also known that Viterbi marginalization is not always linear with respect to the channel BER, and does not always map to the lowest MSE and BER.

Another channel marginalization technique is to add white Gausian noise to the input signal, degrading the input SNR. The method is used in some advanced PRML systems by summing in the output from a programmable noise generator before the equalization step as shown in FIG. 4. By adding noise to the system and optimizing for a $10^{-6}$ range BER, the drive tune time can be reduced. The noise generator, however, disturbs the normal analog signal path and the operation of the read channel, and may not have a one-to-one mapping once the noise source is removed from the read channel.

Further, in this noise generator method, the summing circuit and the noise generator can be a source of error themselves, and may degrade the performance of the channel during normal operations. Additional external hardware and software are also required to extract the BER information from the raw channel output data, similar to Viterbi threshold marginalization.

Alternatively, the MSE of the sampled data can be used in combination with the noise generator for optimization. But again, the drawbacks of the analog MSE are the limiting factor for such a system.

SUMMARY OF THE INVENTION

The present invention discloses a method and apparatus for monitoring a read channel in a disk drive system and calibrating the disk drive system. A comparator is provided to detect the data samples that fall within a pre-programmed distribution window from a number of sectors in each zone of a disk. The output of a comparator is digitized and sent to a logic block to qualify the valid samples. A relative counter or histogram of the detected data samples is obtained. The valid sample count is fed to an n-bit counter that can be accessed via a serial port. The channel parameters can be adjusted based upon a relative figure of merit read off the serial port that reflects the distribution of the samples with respect to the target value after processing a statistically valid number of samples.

Once the initial calibration tunes the read channel such that most of data samples are valid, the invention can be switched to count the number of invalid samples that fall outside the distribution window. Based upon the invalid sample count, the invention performs a fine tuning of the read channel system so that the invalid sample count decreases and reaches an acceptable value. The invention can be fully self-contained on chip if desired, and requires no more than the already existing serial port interface hardware, and very simple additional software. Another major advantage of the invention is that the analog signal path of the sample data and the read channel operation are not distributed by a noise generator, or sub-optimal Viterbi threshold setting.

DETAILED DESCRIPTION OF THE PRESENT INVENTION

A method and apparatus for monitoring a read channel in a disk drive system is described. In the following description, numerous specific details are set forth in order to provide a more thorough understanding of the present invention. It will be apparent, however, to one skilled in the art, that the present invention may be practiced without these specific details. In other instances, well known features have not been described in detail so as not to obscure the present invention.

The preferred embodiment of the invention is used as part of a read channel for data recovery in a magnetic data storage system. It would be apparent to one skilled in the art, however, that the invention is suitable for any signaling system in which partial response methods are used. The invention can be applied to partial response systems such as described by the polynomials 1−D, 1+D, (1−$D^2$), also called duobinary, dicode, and class-IV, respectively.

Figure 1:
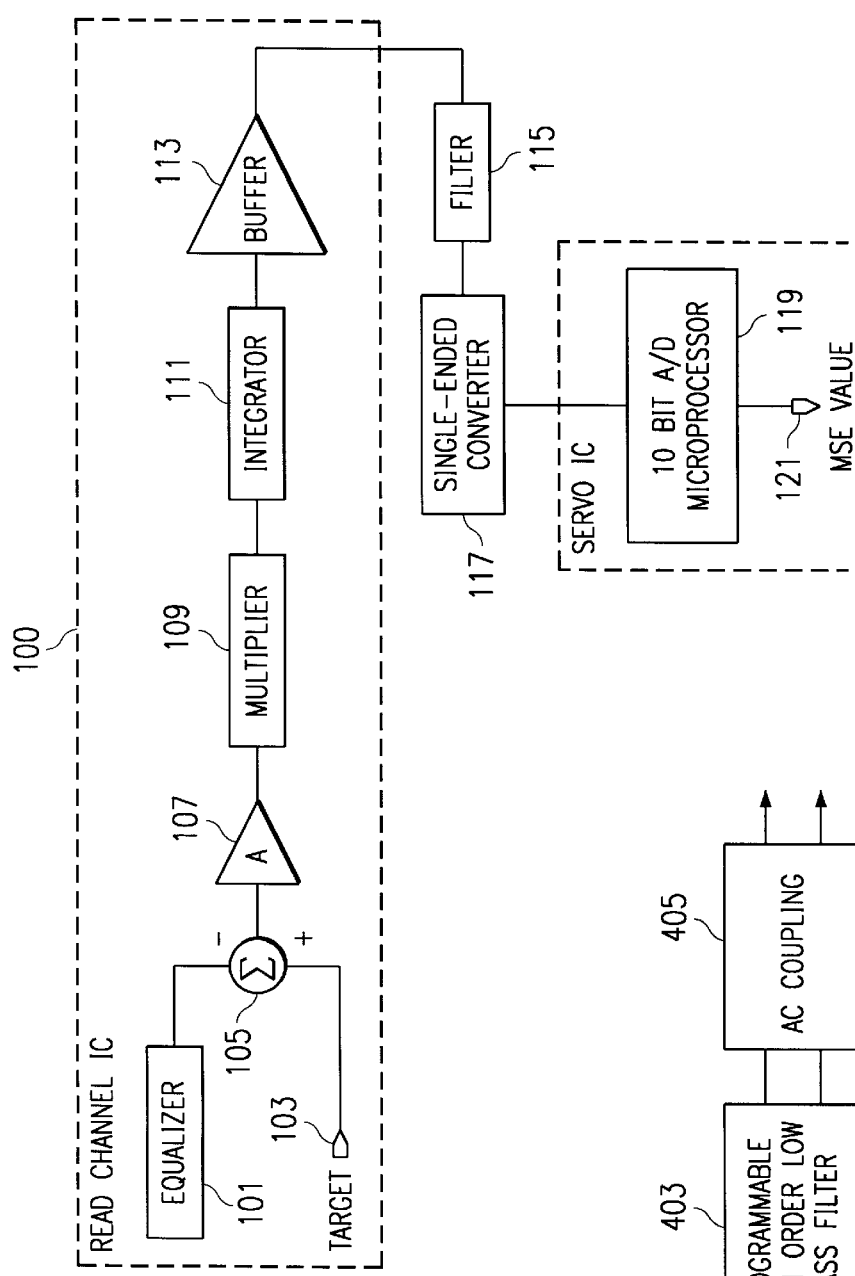
FIG. 1 is a block diagram of the prior art read channel monitor system that uses the MSE (Mean Square Error) technique for PRML (Partial Response Maximum Likelihood) systems.
Figure 4:
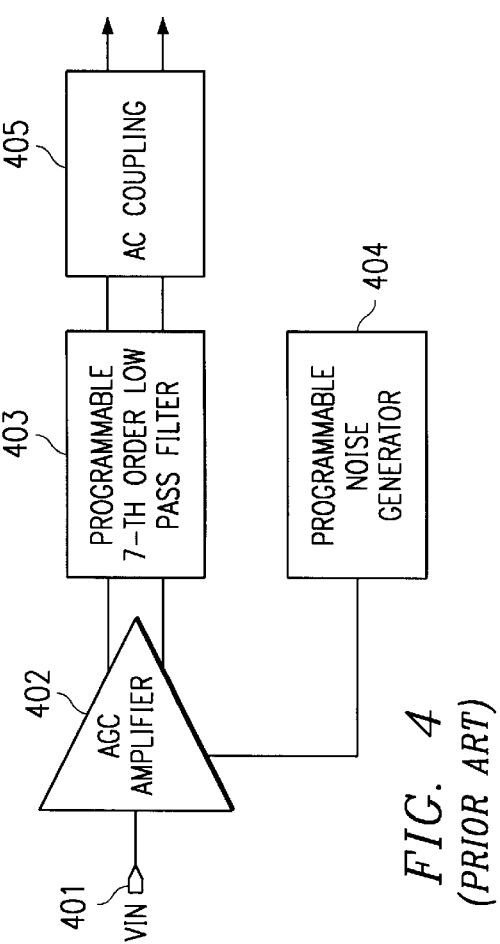
FIG. 4 shows a block diagram of the prior art channel marginalization system that adds white Gausian noise to the input signal.
Figure 2:
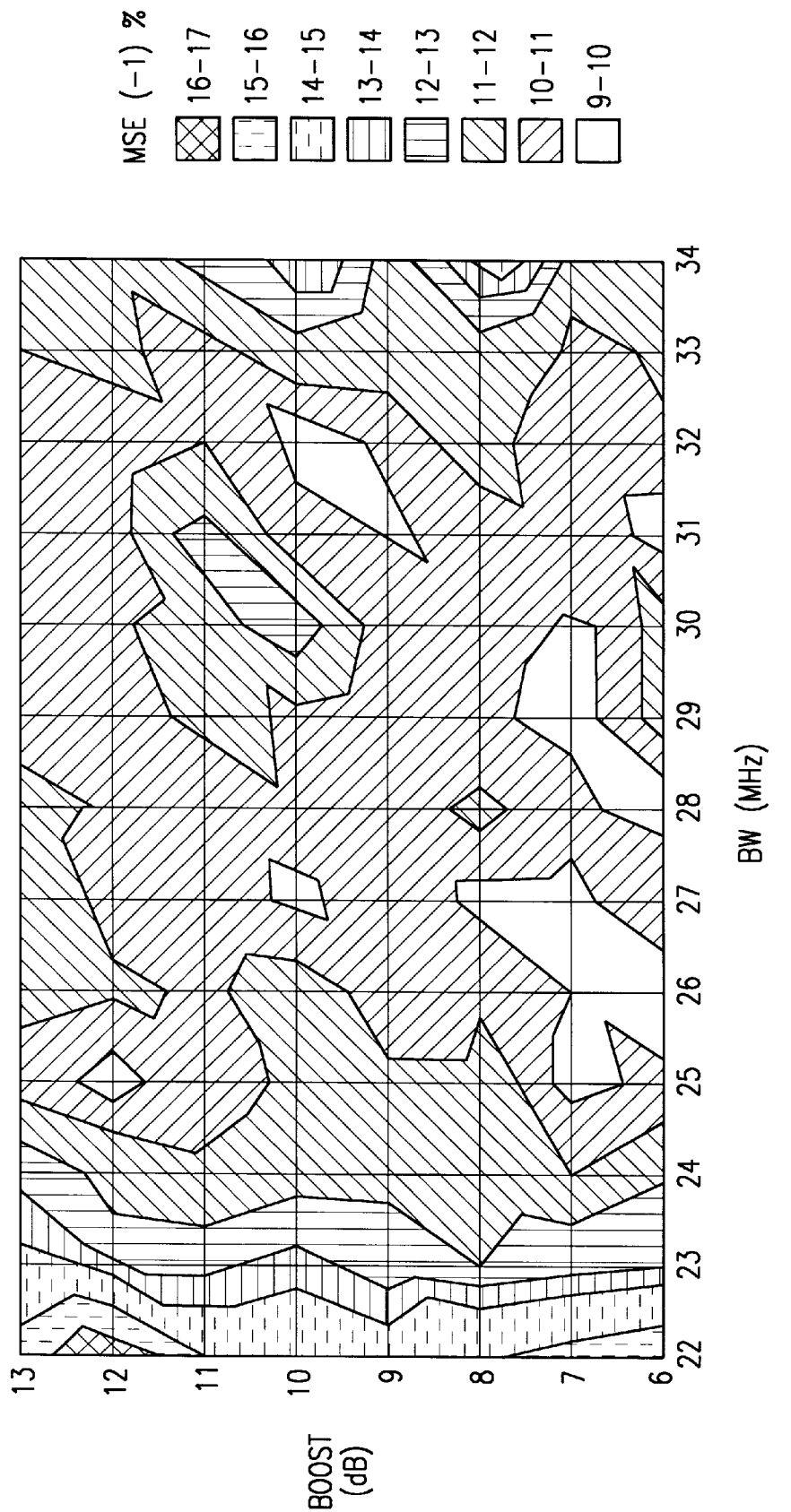
FIG. 2 shows mean square error (MSE) as a function of bandwidth and gain.
Figure 3:
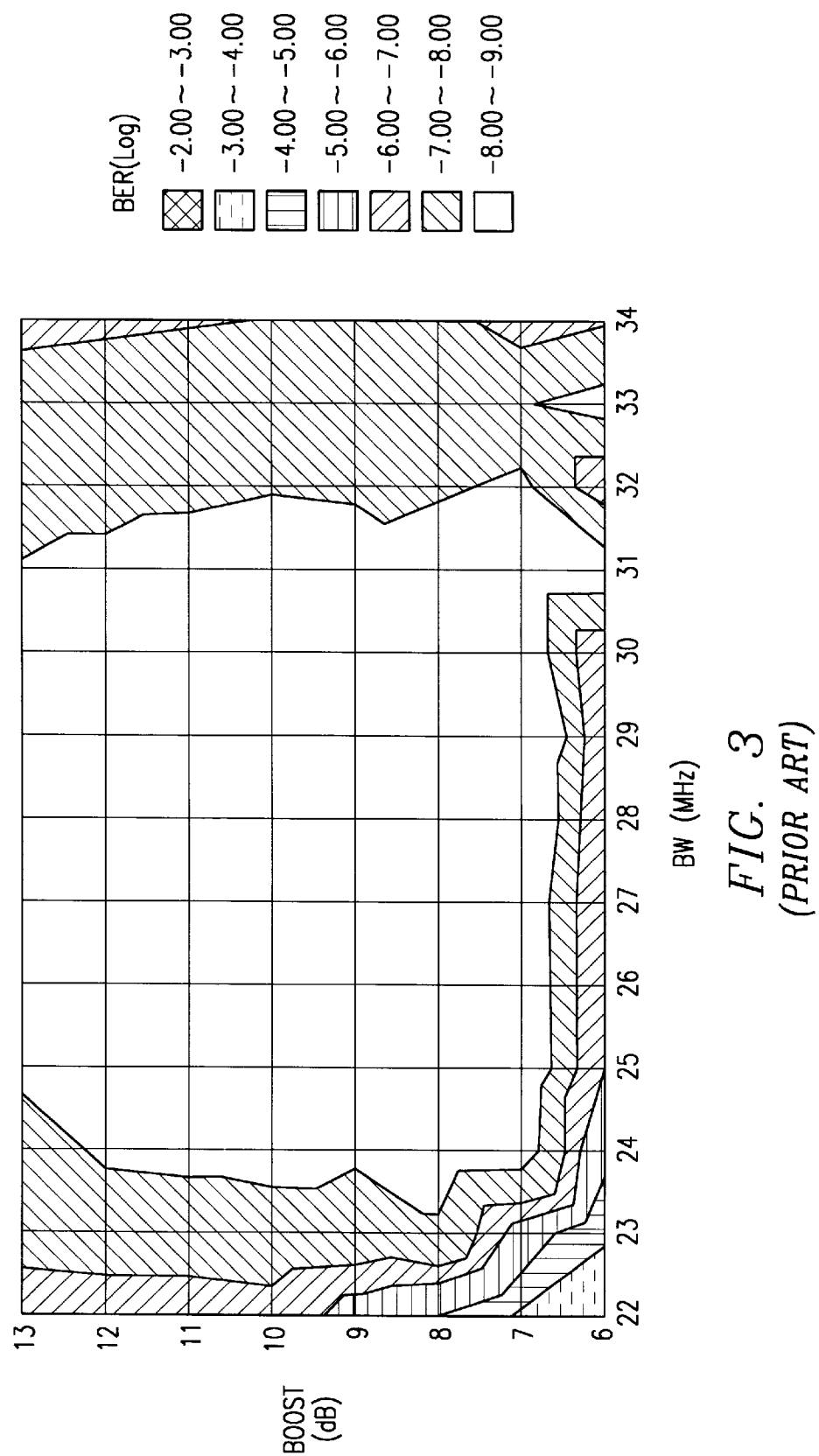
FIG. 3 is $10^{-6}$ BER performance for an optimized read channel by mapping the BER contours with respect to the parameters.
Figure 5:
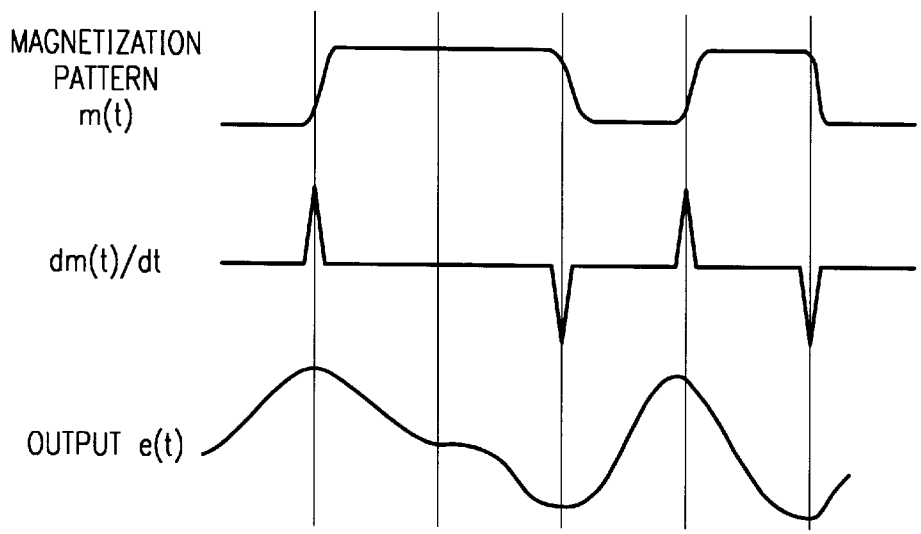
FIG. 5 shows a magnetization pattern m(t) in a digital magnetic recording system where information bits are recorded on a medium using two stable states of magnetization.

In a digital magnetic recording system, information bits are recorded on a medium using two stable states of magnetization. For example, using the NRZ (Non-return-to-Zero) recording method, magnetization pattern m(t) can be created as shown in FIG. 5 m(t) can be represented as $$m(t) = \sum_{k=0}^{\infty} (2a_k - 1) \cdot u(t - kT) - 1(-t) \tag{1}$$

where u(t) is a rectangular pulse of duration T:

$$u(t) = \begin{cases} 1 \text{ for } 0 \le t \le T \\ 0 \text{ for else} \end{cases}$$

and 1(t) is a unit step function:

$$1(t) = \begin{cases} 1 \text{ for } t \ge 0 \\ 0 \text{ for } t < 0 \end{cases}$$

In reading back the recording pattern, the output voltage e(t) is given by:

$$e(t) = \left[\frac{d}{dt} m(t)\right] * h(t) \tag{2}$$

where h(t) represents the magnetic field response to a unit step function and * means convolution operation.

Combining eqs. (1) and (2) yields $$e(t) = h(t) * \left[\sum_{k=0}^{\infty} (2a_k - 1)\{\delta(t-kT) - \delta(t-kT-T) + \delta(t)\}\right]$$

$$= 2\sum_{k=0}^{\infty} x_k h(t - kT)$$

$$\text{where } x_k = \begin{cases} a_k - a_{k-1} \text{ for } k \ge 1 \\ a_0 \text{ for } k = 0 \end{cases}$$

Thus, $x_k$ can have three different levels of −1, 0, or +1. The $x_k$ sequence, however, is not generated nor observed in the recording system. The invention is not limited to the NRZ and can be applied in conjunction with any other suitable recording methods such as FSK (Frequency Shift Keying) and Manchester coding.

Referring to FIG. 5, the play back signal e(t), however, can be sampled and quantized by an analog-to-digital converter to generate raw data samples of $x_k$ sequence. Since the retrieval of the recorded information requires accurate detection of pulse sequences and $x_k$ sequence may contain errors, maximum likelihood sequence estimation (MLSE) technique such as the Viterbi algorithm is used to improve the detection of symbol (pulse) sequences in the presence of noise and intersymbol interference. Thus, the $x_k$ sequence is fed to a decoding stage such as a Viterbi decoder to retrieve the original information as accurately as possible.

An MLSE detection technique such as Viterbi is necessary since when the coded information is transmitted from a source to a destination, it typically introduces transmission errors and corrupt the original transmitted data. The various ways in which digital data can be conveyed make it more difficult to identify and compensate for errors because of many different error mechanisms associated with them.

For example, in magnetic recording, error sources can range from mechanical problems such as poor read/write head contact to Gaussian noise in replay circuits and heads. Whether it is a mechanical problem or Gausssion thermal noise, the result is less than perfect and often corrupted data on the receiving side that are not the same as the transmitted data.

In Viterbi decoding, the received data is sampled and quantized to three-bit accuracy, path metric calculations are performed in digital electronics. In Viterbi algorithm, data is not decoded as soon as it is received. Instead, a sequence of data, having a predetermined decoding depth, following the digit to be decoded is first collected. By computing path metrics (the accumulated log likelihood), a limited number of possible sequences are identified with one survivor sequence ending in each of the data states. The highest correlated of the survivor sequences is selected to be the sole survivor sequence. However, for an ML sequence estimator or a Viterbi detector to accurately reproduce the original information, $x_k$ sequence needs to be taken on the incoming analog signal waveform at precise regular locations.

Figure 6:
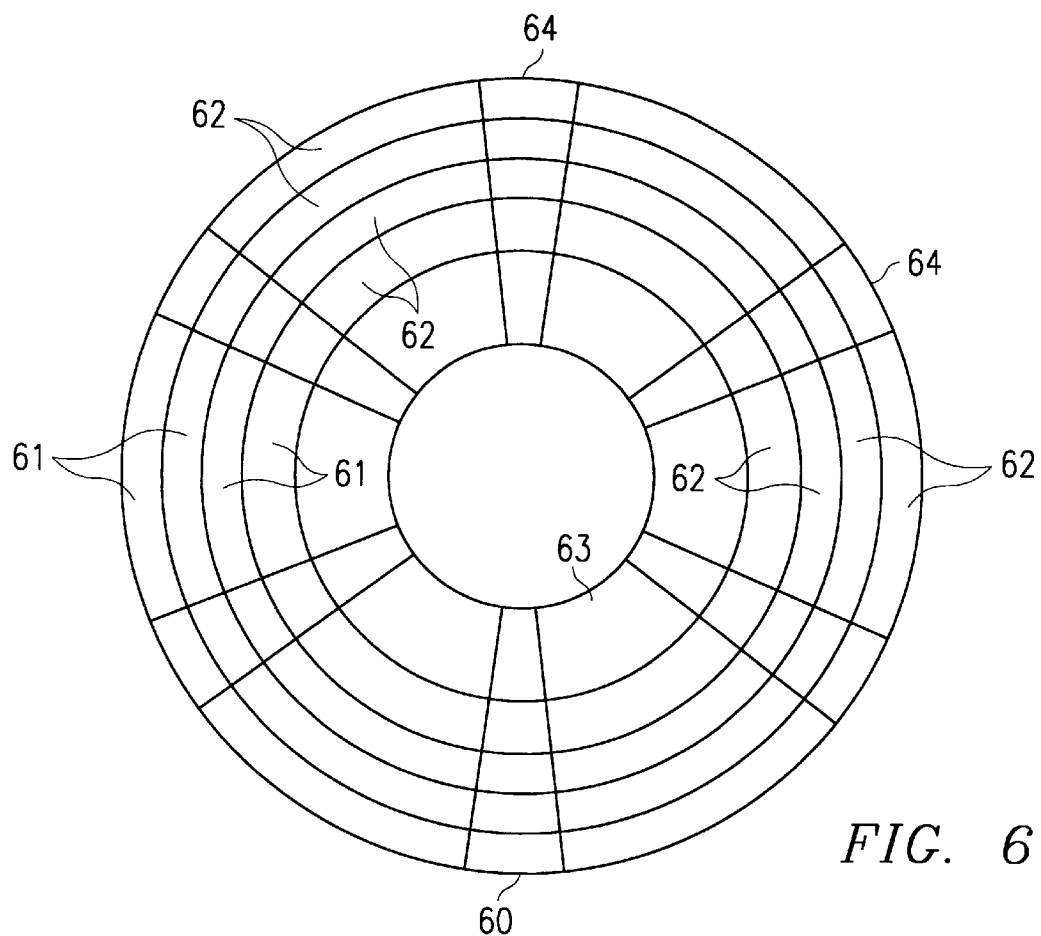
FIG. 6 illustrates a recording pattern formed on a magnetic disk surface.

Another factor that can affect the accuracy of raw data samples $x_k$ is the flux density variations in a disk drive. FIG. 6 illustrates a recording pattern formed on a magnetic disk surface. Referring to FIG. 6, a storage disk 60 comprises a plurality of concentric data tracks 61 which are further divided into zones 62. The storage disk 60 also comprises inner landing zone area 63 and servo sectors 64. Each data zone-has a bit transfer rate optimized for a real transition domain densities for the particular radius of the zone. With larger radii than inner tracks, the outer tracks can store more user data than inner tracks. The data flux change rate will remain constant with each data zone.

The zoned approach shown in FIG. 6 helps normalize flux densities across the radially distributed tracks. However, there are still variations in flux density from data zone to data zone that may adversely affect the accuracy of raw data samples and cause detection errors.

These errors stemming from various causes can be compensated to minimize detection errors at the output of a Viterbi detector by adjusting some front end parameters including those in the equalization, sampling and quantization stages. Fine tuning a whole read channel system, however, can include adjusting hundreds of parameters. Fine tuning a disk drive system for even lower error rates may involve adjusting more than two thousand parameters. The invention provides a method and apparatus for monitoring a read channel quality as an effective tool for mapping disk drive defects with the read channel parameters so that tuning a large number of parameters of a disk drive system can be performed in an efficient and speedy manner with a reduced tuning time.

In a preferred embodiment of the present invention, the quality of a read channel is monitored by counting the number of detection errors for a pre-programmed target window. The number of detection errors are outputted through a serial port to provide an effective indicator of the system performance. Using the number of detection errors read off the serial port, a relative figure of merit can be calculated so that fine tuning of a disk drive system can be executed efficiently.

Figure 7:
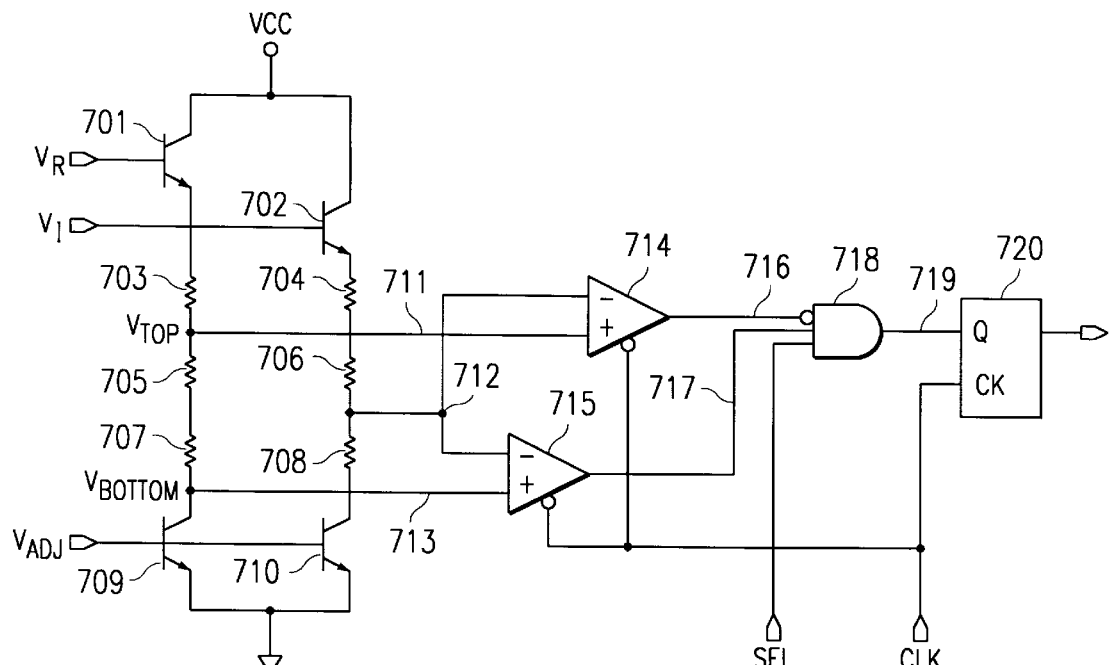
FIG. 7 is a block diagram of a TARGET circuitry for generating the target window levels according to the preferred embodiment of the invention.

FIG. 7 is a block diagram of a TARGET circuitry for generating the target window levels according to the preferred embodiment of the invention. Referring to FIG. 7, a matched dual resistor ladder is implemented by resistors 703, 704, 705, 706, 707, and 708, which are used to generate the reference target window levels $V_{TOP}$ 711 and $V_{BOTTOM}$ 713. The reference voltage $V_R$ is coupled to the base of transistor 701, the emitter of which is coupled to resistors 703, 705, and 707 in series. The input voltage $V_I$ is coupled to transistor 702, the emitter of which is coupled to series resistors 704, 706, and 708. The target window levels 711 and 713 are coupled to comparators 714 and 715. The input voltage $V_I$ is level shifted by transistor 702 and series resistors 704, 706 and 708 and fed to comparators 714 and 715 through node 712.

The target window size is determined by $V_{ADJ}$ which is controlled by a single DAC via a serial port. Typically, the target window size varies from 45 to 200 mV. The inverted output 716 and output 717 of comparators 714 and 715 are fed to AND gate 718. The output 719 of AND gate 718 is latched by flipflop 720. Thus, when the level shifted sample value of the input $V_I$ lies between the target window levels $V_{TOP}$ and $V_{BOTTOM}$, the latch 720 outputs a logic "1". Otherwise, the input $V_I$ is outside of the target range due to a detection error and considered invalid.

Still referring to FIG. 7, SEL signal is coupled to AND gate 718. CLK signal is coupled to flipflop 720. An inverted CLK signal is fed to comparators 714 and 715.

Figure 8:
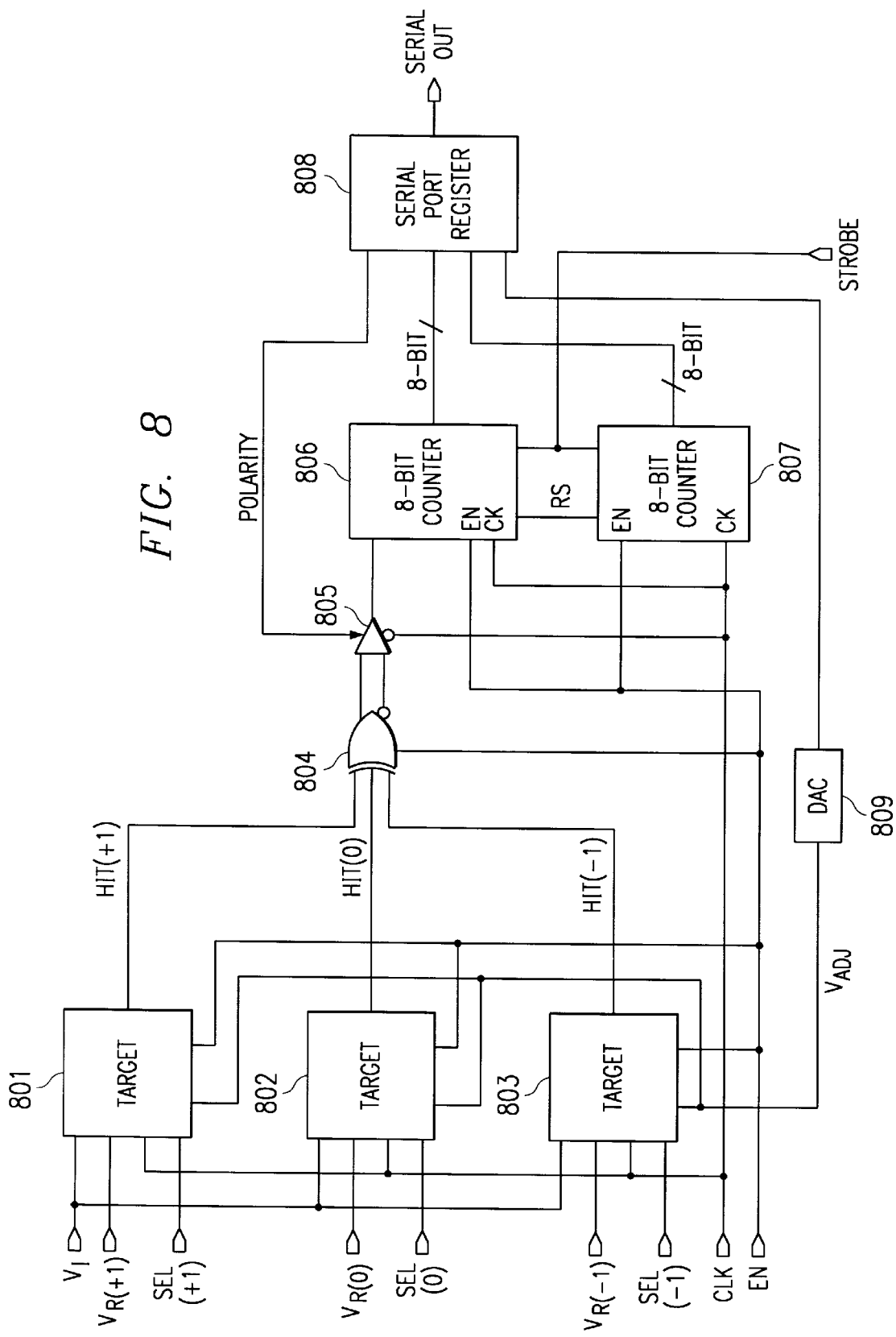
FIG. 8 is a circuit diagram for generating an accumulated count of sample values for three threshold targets (+1, 0, −1).

FIG. 8 is a circuit diagram for generating an accumulated count of sample values for three threshold targets (+1, 0, −1). Referring to FIG. 8, the latched outputs of TARGET circuits from the +1, 0, and −1 samples are combined with a XOR/XNOR gate depending on whether the statistic of "hit" or "miss" is desired. The three TARGET blocks 801, 802, 803 are implemented by a circuitry such as shown in FIG. 7. However, in alternate embodiments of the invention, any other method or apparatus can be used to generate target window levels. For example, a reference level can be generated from a programmable digital register combined with digital-to-analog conversion.

Referring to FIG. 8, a "hit" is when one of the three TARGET outputs is "1". The outputs of the three TARGET blocks 801, 802, and 803 are fed to XOR/XNOR gate 804. The XOR/XNOR gate 804 outputs an output and its complement to multiplexer/latch 805 such that there is a stable latched value provided to cascaded counters 806 and 808 until the next clock.

Polarity input is coupled to multiplexer/latch 805 and serial register 808 so that the counters can select to count the number of "hit"s or "miss"es depending on the polarity value. For example, if polarity is logic "1", the multiplexer/latch 805 feed the normal output to the cascaded counters, and the counters count the number of "hit"s. For polarity "0", the multiplexer/latch 805 feed the complementary output to the cascaded counters and the number of "miss"es is counted. This feature allows the invention to easily switch the monitoring parameter from the number of hits to the number of misses. This is useful for switching from calibration mode to operational mode. The outputs of counters 806 and 807 are coupled to serial register 808 for routing the accumulated value to the serial port.

As shown in FIG. 8, special select (SEL) features allows the invention to selectively look at the "+1", "0", "−1"samples for further fine tuning of the disk drive system. DAC 809 converts the value stored in serial port register 808 into $V_{ADJ}$, which is then coupled to TARGET circuits 801, 802, and 803 to provide a feedback signal $V_{ADJ}$ to adjust the reference levels.

The enable (EN) pin is used to activate the channel quality monitor circuit of FIG. 8 when a calibration is needed for a read channel. After the calibration is completed, the read channel is returned to an operational mode and the EN pin is disabled to shut off the monitor circuit, reducing the operating power of the read channel system. The EN pin is implemented in the TARGET circuitry of FIG. 7 to reduce the power consumption. This implementation is well-known in the art, and therefore is not shown in detail herein. For example, the EN signal can be coupled to flipflop 720, AND gate 718, comparators 714 and 715, and the matched dual resistor ladder of FIG. 7 so that, when disabled, the circuit is cut off from the power supply.

Figure 9:
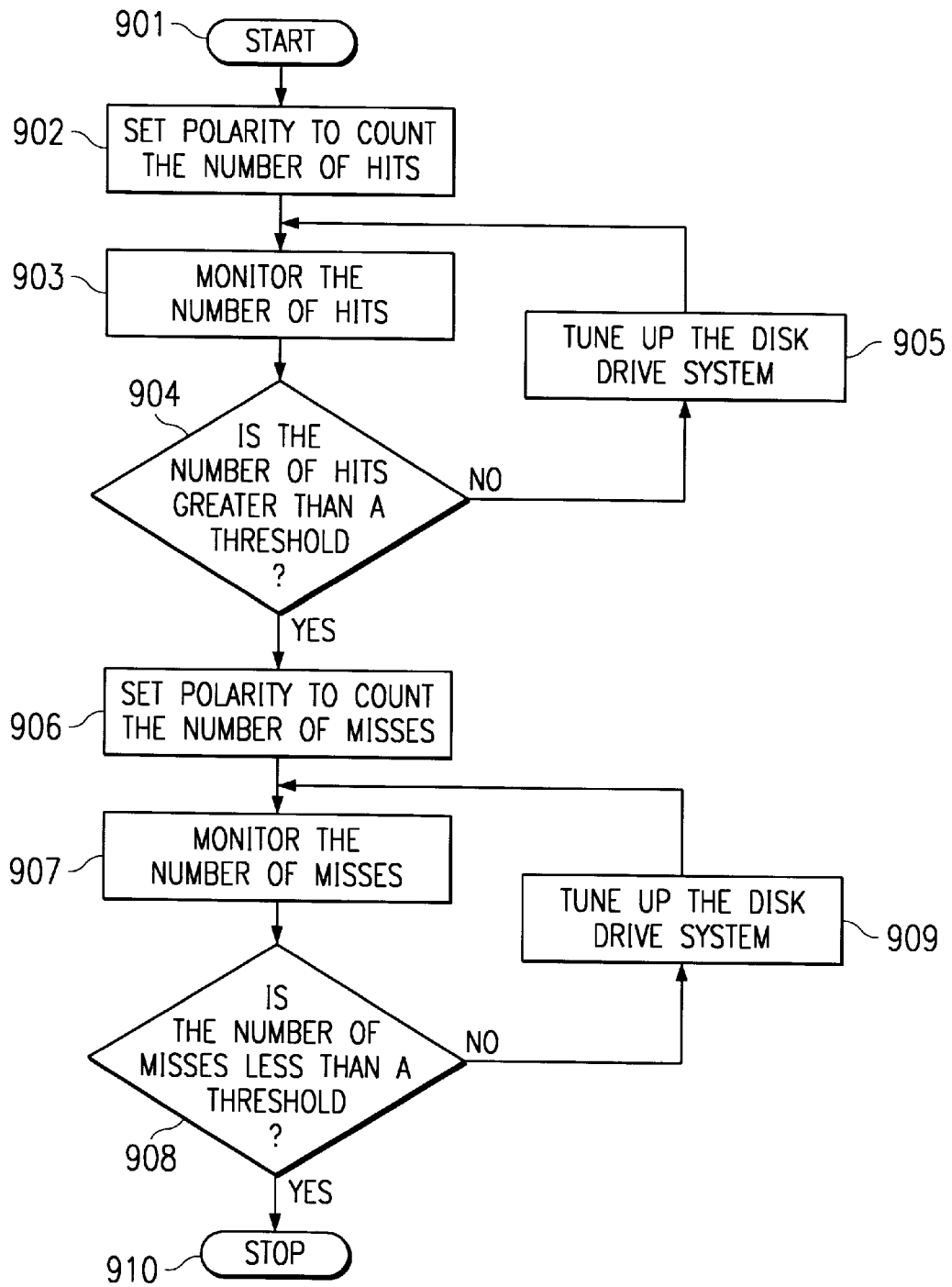
FIG. 9 is a flowchart for a system calibration in a preferred embodiment of the invention.

FIG. 9 is a flowchart for a system calibration in a preferred embodiment of the invention. Referring to FIG. 9, when starting to tune up a read channel system, there are a lot of sample values missing the target window and accordingly, the polarity is adjusted to count the number of "hit" samples at step 902. At step 903 the number of "hit" samples are monitored and read off. The count value read off is a relative figure of merit that reflects the distribution of the samples with respect to the target value after processing a statistically valid number of samples. At step 904 a determination is made whether the number of hits is greater than a threshold value. If not, tune up of appropriate disk drive system parameters are then performed to raise the number of "hit"s at step 905. The user can vary appropriate channel parameters for fine tuning of the system based upon the relative figure of merit.

If the number of hits is greater than the threshold value, then the polarity is set to count the number of "miss" samples at step 906. The number of "miss" samples is monitored at step 907 and the disk drive system is tuned up at step 909 until an acceptable level of miss samples is reached at step 908. The threshold value to test the number of hit samples can be set to any appropriate value. For example, when the number of "hit"s begins to level off with no apparent improvement despite continued system tuning, the system is switched to a "miss" monitoring mode. Looking, at the "missed" samples can maximize the n-bit counter range when most samples are hitting the target.

If necessary, more complex statistical analysis can be performed by collecting and analyzing the monitored data over time using an appropriate statistical analysis method. If the calibration is successful, the read channel is returned to an operational mode. Otherwise, additional calibration may be performed to complete the read channel tune-up.

Figure 10:
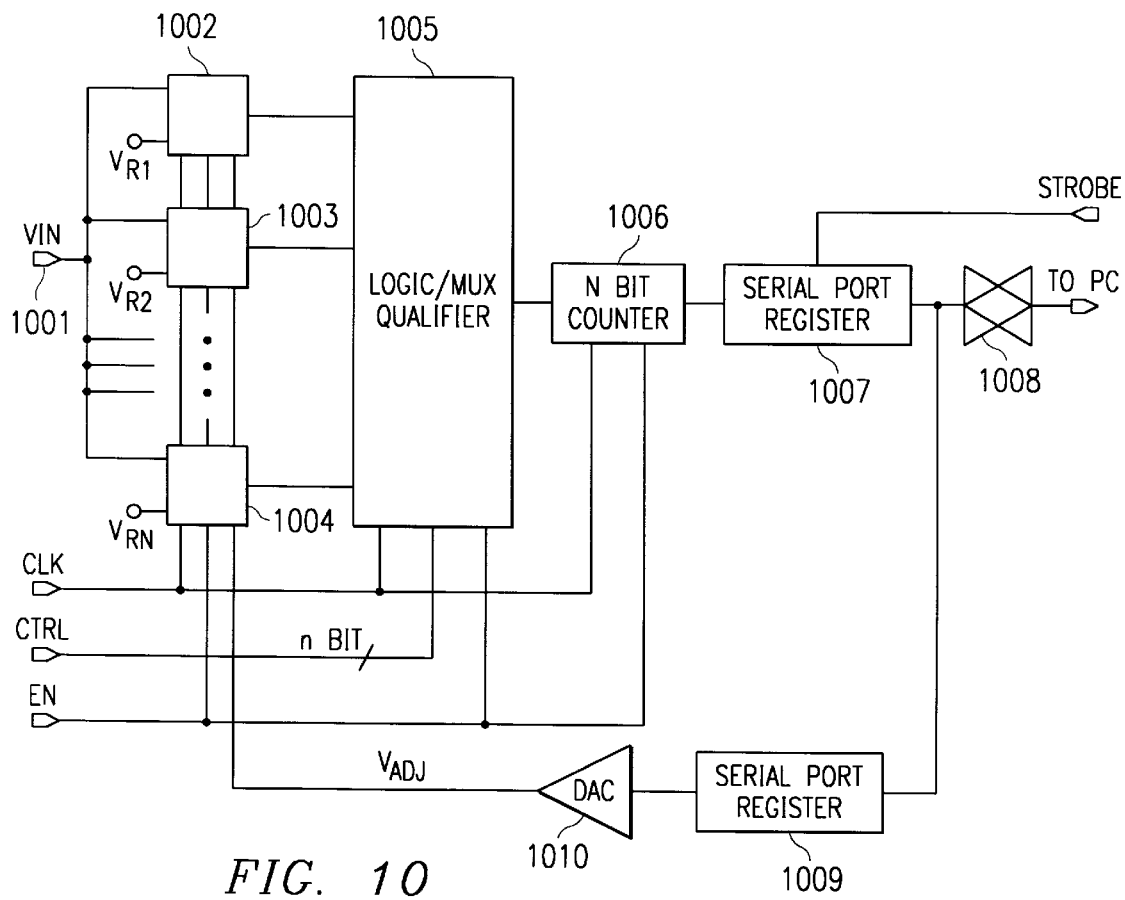
FIG. 10 is a block diagram of a preferred embodiment of the invention for n threshold targets.

FIG. 10 is a block diagram of a preferred embodiment of the invention for n threshold targets. In FIG. 10, input signal $V_{IN}$ 1001 is coupled to window qualifiers 1002, 1003, . . . , 1004. Reference signals $V_{R1}$, $V_{R2}$, . . . , $V_{RN}$ are coupled to window qualifiers 1002, 1003, . . . , 1004 respectively. Window qualifiers 1002, 1003, . . . , 1004 can be implemented using a circuit such as shown in FIG. 7. It will be apparent, however, to one skilled in the art, that any other suitable circuit can be utilized in alternate embodiments of the invention. For example, window reference levels can be generated from a scaled resistor network or an R-2R ladder.

Input signal detection can be performed for up to N reference windows depending upon the scale and the accuracy required in detecting the input signal. The outputs of window qualifiers 1002, 1003, . . . , 1004 are coupled to logic/multiplexer qualifier 1005. Logic control signal CTRL is coupled to logic/multiplexer qualifier 1005. Logic/multiplexer qualifier 1005 comprises a XOR and a multiplexer circuitry such as XOR/XNOR 804 and multiplexer/latch 805 shown in FIG. 8. However, in alternate embodiments of the invention, any other circuitry that combines the outputs of window qualifiers 1002, 1003, . . . , 1004 such as an OR logic can be used. An n-bit counter 1006 is coupled to the output of logic/multiplexer qualifier 1005.

The output of the n-bit counter 1006 is coupled to serial port register 1007, which is also coupled to a PC (Personal Computer) interface through bi-directional buffer 1008 and to serial port register 1009. Serial port register 1009 is coupled to digital-to-analog converter (DAC) 1010 to provide a feedback signal $V_{ADJ}$ to adjust the reference levels for window qualifiers 1002, 1003, . . . , 1004.

Thus, in one embodiment of the invention, fine tuning is performed in a read channel system by measuring the distribution of the equalizer samples and providing a relative counter or histogram of the data samples that fall within a pre-programmed distribution window from a number of sectors in each zone of a storage disk.

The invention is fully self-contained on a chip and requires no more than already existing serial port interface hardware and additional software. Another advantage of the invention is that the analog signal path of the sample data and the read channel operation are not distributed by a noise generator, or sub-optimal Viterbi threshold setting.

Thus, a method and apparatus for monitoring a read channel in a disk drive system and calibrating the disk drive system has been described in conjunction with one or more specific embodiments. It will be appreciated by one skilled in the art that the invention is applicable to any system where a signal quality or signal qualification is required. The invention is defined by the claims and their full scope of equivalents.

I claim:

1. A circuit for monitoring a channel quality comprising:
    a reference level generator providing a reference window representing a plurality of reference levels;
    a comparator coupled to said reference level generator to produce an output signal based upon said reference window and a channel signal;
    a counter coupled to said comparator to track the number of signals from said channel that fall within said reference window;
    a second reference generator providing a second reference window representing said plurality of reference levels;
    a second comparator coupled to said second reference generator to produce a second output signal based upon said second reference window and said channel signal, said comparator coupled to said counter; and
    a summing circuit with input terminals coupled to said reference generators and providing outputs to said counter.

2. The circuit of claim 1 further comprising a multiplexer with a polarity input coupled to said summing circuit and said counter.

3. The circuit of claim 2 further comprising a serial port register for outputting a serial output.

4. The circuit of claim 3 wherein said serial port register provides a feedback adjust signal to said reference generators.

5. A circuit for monitoring a channel quality comprising:
    a reference level generator providing a reference window representing a plurality of reference levels;
    a comparator coupled to said reference level generator to produce an output signal based upon said reference window and a channel signal,
    a counter coupled to said comparator to track the number of signals from said channel that fall within said reference window;

a voltage divider coupled to a reference level input and providing at least two outputs of different levels;

a level shifter coupled to an input signal and providing a level-shifted output;

a level controller coupled to said voltage divider, said level shifter and a level adjust signal;

a first comparator coupled to said voltage divider and said level shifter;

a second comparator coupled to said voltage divider and said level shifter; and an AND gate coupled to the outputs of said first and second comparators.

6. A method for monitoring a channel quality comprising the steps of:

generating a reference window;

comparing a channel signal with said reference window;

producing a match signal when said channel signal is within said reference window;

counting the number of channel signals that fall within said reference window;

generating a second reference window;

comparing a channel signal with said second reference window;

producing a match signal when said channel signal is within said second reference window; and counting the number of channel signals that fall within said second reference window.

7. The method of claim 6 further comprising the step of summing said number of channel signals that fall within said first reference window and said number of channel signals that fall within said second reference window.

8. The method of claim 6 further comprising the step of counting the number of channel signals that are outside of said first and said second reference windows.

9. The method of claim 7 further comprising the step of serially outputting said summed number of channel signals that fall within said first reference window and that fall within said second reference window.

10. The method of claim 9 further comprising the step of providing said serial output to said first and second reference generators for a feedback.

11. The method of calibrating a read channel system in a disk drive, said system comprising an equalizer and a filter, said method comprising the steps of:

generating a plurality of reference windows, each of said plurality of reference windows specifying at least two levels;

comparing a channel signal with each of said plurality of reference windows and outputting a hit output when said channel signal is within one of said plurality of reference windows;

counting the number of hits for a sequence of channel signals;

providing said number of hits in a feedback loop to adjust the sizes of reference windows of said plurality;

adjusting characteristics of said filter and said equalizer to increase the number of hits.

12. The method of claim 11 further comprising the step of tuning system parameters of said disk drive to increase the number of hits.

13. The method of claim 11 further comprising the step of comparing a channel signal with each of said plurality of reference windows and outputting a miss output when said channel signal is outside of said plurality of reference windows.

14. The method of claim 13 further comprising the step of:

adjusting characteristics of said filter and said equalizer to decrease the number of misses.

15. The method of claim 13 further comprising the step of tuning system parameters of said disk drive to decrease the number of misses.

* * * * *